United States Patent [19]

Nishimura et al.

[11] Patent Number: 4,895,235

[45] Date of Patent: Jan. 23, 1990

[54] CLUTCH

[75] Inventors: Yoshio Nishimura; Seiichi Kitano; Yasunobu Fukatani; Masaaki Asada; Kazuhiko Yoneda, all of Neyagawa, Japan

[73] Assignee: Kabushiki Kaisha Daikin Seisakusho, Neyagawa, Japan

[21] Appl. No.: 173,528

[22] PCT Filed: Jun. 10, 1987

[86] PCT No.: PCT/JP87/00374

§ 371 Date: Feb. 17, 1988

§ 102(e) Date: Feb. 17, 1988

[87] PCT Pub. No.: WO87/07929

PCT Pub. Date: Dec. 30, 1987

[30] Foreign Application Priority Data

Jun. 17, 1986 [JP] Japan .................................. 61-142140

[51] Int. Cl.[4] ...................... F16D 13/56; F16D 23/14
[52] U.S. Cl. .................. 192/70.3; 192/89 B; 192/98; 192/99 A
[58] Field of Search ..................... 192/70.25, 98, 70.3, 192/99 A, 89 B

[56] References Cited

U.S. PATENT DOCUMENTS

| 2,366,594 | 1/1945 | Carlson | 192/70.25 |
| 3,394,788 | 7/1968 | Sink | 192/99 A X |
| 4,234,067 | 11/1980 | Billet | 192/98 |
| 4,720,002 | 1/1988 | Kitano et al. | 192/70.25 |
| 4,754,860 | 7/1988 | Fukutake et al. | 192/70.25 |

Primary Examiner—Rodney H. Bonck
Attorney, Agent, or Firm—Armstrong, Nikaido, Marmelstein, Kubovcik & Murray

[57] ABSTRACT

A pull-type clutch for connecting a flywheel to a transmission and having clutch discs spline fitted onto an input shaft of the transmission, a sleeve on the outer periphery of the input shaft, a release bearing fastened to the transmission end of the sleeve, a flange portion formed on the flywheel end of the sleeve and projecting toward the outer periphery, a load transmitting retainer on the sleeve pressed to the flange portion, a clutch cover connected to the flywheel and covering a pressure plate for pressing the clutch discs into engagement with the flywheel, a disc-formed spring member disposed between the clutch cover and the retainer, levers for transmitting spring force of the spring member disposed between the retainer and the pressure plate at plural circumferential locations and pins between the retainer and the clutch cover for sliding movement of the retainer relative to the clutch cover.

5 Claims, 5 Drawing Sheets

CLUTCH

DESCRIPTION

1. Technical Field

This invention relates to a pull-type clutch which is released by pulling a release bearing toward the transmission side of the clutch by means of a releasing lever connected to a clutch pedal.

2. Background Art

In a conventional pull-type clutch, as shown in FIG. 5, a slantly disposed coil spring 100 is used as a load generating member. The spring force is transmitted to a retainer so that a pressing force on a clutch disc 108 is actuated from the retainer 102 through a lever 104 to a pressure plate 106. (Japanese Examined Patent Application No. 46-15046 based on U.S. patent application No. 549,009, now U.S. Pat. No. 3,394,788).

However, such conventional clutch has a problem in that the spring force of the coil spring 100 causes the pedal depressing force to increase with an increase in a stroke of the clutch pedal. This leads to an increase in the pedal depressing force at the time of releasing of the clutch.

A further problem is that, at the time of high-speed rotation, centrifugal force acting on the coil spring 100 compresses the coil spring 100 to reduce the spring force applied on the pressure plate 106.

The applicants of this application have developed a new clutch which overcome such problems in the pull-type clutch and have filed a patent application on such new clutch U.S. patent application Ser. No. 900,655, now U.S. Pat. No. 4,720.002, dated Jan. 19, 1988, based on Japanese Patent Application No. 60-194158).

In applicants' prior '655 U.S. application, as shown in FIG. 6, a diaphragm spring 110 is used. Such diaphragm spring 100 is held on a clutch cover 116 by means of wire rings 112 and a stud pin 114. A retainer 111 is splined fitted on a sleeve 113 and the clutch cover 116 and the retainer 111 are assembled with studs 117 to rotate as one piece.

However, there is a problem in the clutch of such '655 U.S. application in that the machining costs are high because it is necessary to work a milling machining on the studs 117 of the clutch cover 116.

DISCLOSURE OF THE INVENTION

An object of the invention is to provide a clutch which can reduce the costs of machining in the so-called pull-type clutch.

COMPOSITION OF THE INVENTION (1) Technical measure

In a clutch carrying out a releasing operation so as to pull a release bearing away from a flywheel by means of a releasing lever connected to a clutch pedal; a clutch disc is spline fitted onto an input shaft of a transmission side, a sleeve is provided on an outer periphery of the input shaft, a release bearing is fastened to a transmission side end of such sleeve, a flange portion is formed on a flywheel side of such sleeve to project toward the outer periphery of the clutch; a load transmitting retainer is provided on the sleeve for fixing a thrust force transmitting member on the flange portion and is pressed onto the flange portion; a clutch cover is connected by the flywheel and covering a pressure plate for pressing the clutch disc; a disc-formed spring member is disposed between the clutch cover and the retainer; a lever for transmitting the spring force of the spring member is disposed between the retainer and the pressure plate; a pin passes through the spring member between the retainer and the clutch cover and the retainer is axially slidable.

(2) Function

Machining work of the retainer and the clutch cover are reduced because the retainer and the clutch cover are engaged by the pin.

There is no need to set a circumferential angle of the retainer because the retainer is pressed to the flange portion of the sleeve placing the thrust force transmitting member between the retainer and the flange.

BEST MODE FOR CARRYING OUR THE INVENTION

Figure 1:
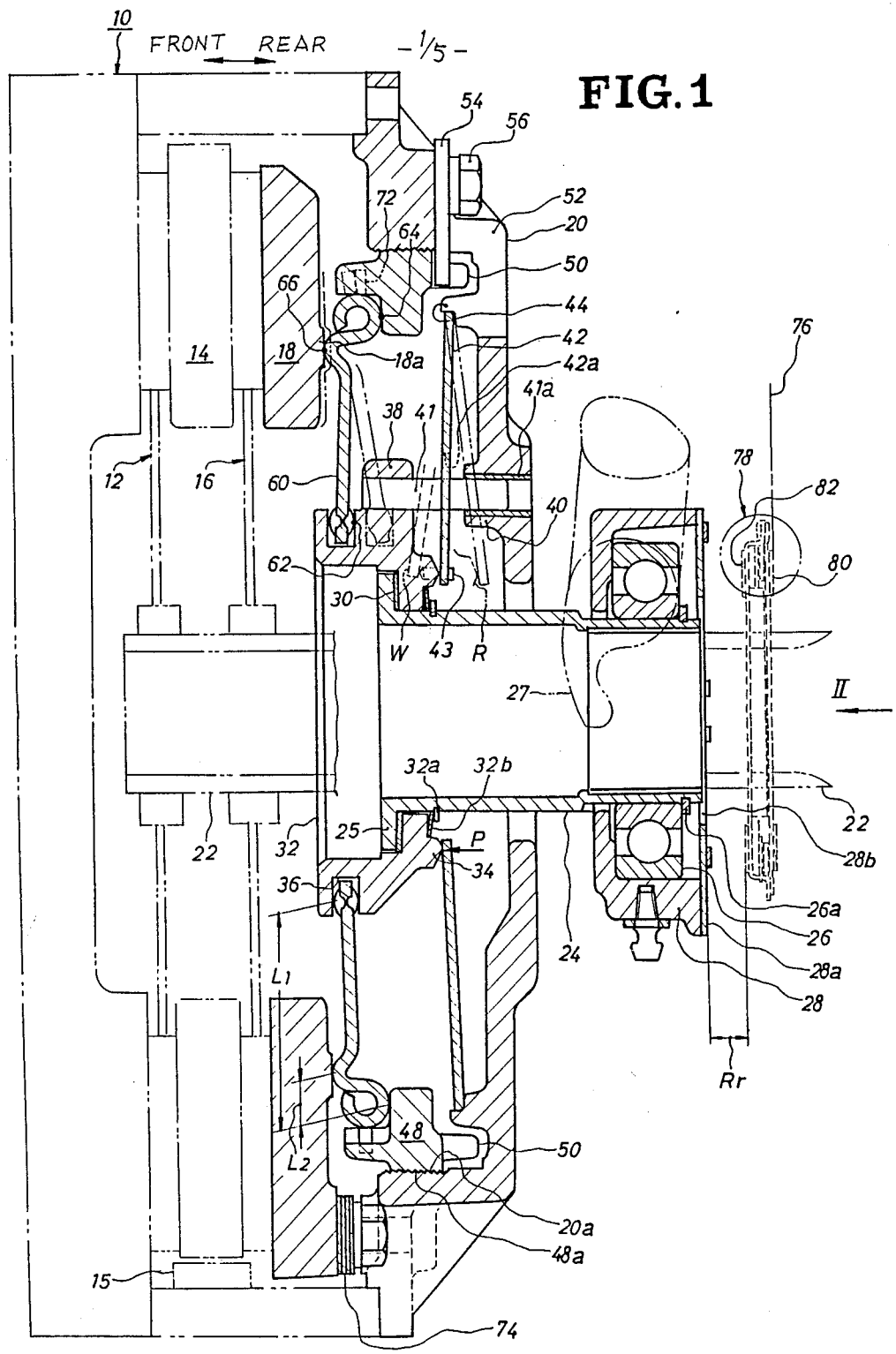
FIG. 1 is a vertical sectional view of a clutch according to the present invention.

In FIG. 1, a vertical sectional view of the clutch according to the present invention, taken at the line A-O-A, FIG. 1, 10 is a flywheel. A clutch disc 12, an intermediate plate 14 and a clutch disc 16 are pressed to the back face of flywheel 10 by pressure plate 18. A pin 15 is fixed to the flywheel 10 radially outside of the intermediate plate 14 for rotating the intermediate plate 14 with flywheel 10.

Clutch cover 20 covers pressure plate 18 at the rear side of the pressure plate 18. The clutch cover 20 is formed into a thick wall by forging, for example. The clutch discs 12 and 16 are spline fitted onto an input shaft 22 of a transmission to the rear of the clutch, i.e., to the right in FIG. 1.

A cylindrical sleeve 24 fits axially slidingly onto the radial outer periphery of the input shaft 22. A release bearing 26 is fastened, by a snap ring 26a, to a rear end or a transmission side end of the sleeve 24. A bearing holder 28, covering the release bearing 26, is provided at an outside of the release bearing 26. Pressing plate 28a is fixed to a rear end face of the bearing holder 28. A through hole 28b, through which the input shaft 22 passes, is provided on the pressing plate 28.

In FIG. 1, releasing lever 27, connected in conventional manner to a clutch pedal, not shown, shifts the release bearing 26 in its axial direction.

A flange portion 25 projects from the outer periphery at the front end portion of the sleeve 24. A retainer 32 is pressed onto the flange portion 25 with a thrust washer 30, or thrust force transmitting member, therebetween. A thrust bearing may be used instead of the thrust washer 30. The retainer 32 is pressed forwardly on sleeve 24 by means of a cone spring 32b held on the sleeve 24 by means of a snap ring 32a. The sleeve 24 is made by forging, for example.

The release bearing 26 is shifted to the rearward, and the sleeve 24 moves together with the release bearing 26 to the rearward, i.e, to the right, FIG. 1. The retainer 32 is pulled to the position R shown by alternate long and two short dash lines in FIG. 1.

The retainer 32 is made, for example, by casting and forming into approximately annular shape. A pressing part 34 is formed at a rear face side end of the retainer 32 over the entire periphery. An annular groove 36 is formed at a front face side end of retainer 32. Projections 38 are integrally formed on a radially outer peripheral part of the retainer 32 at, for example, three places with equal distances provided therebetween in a circumferential direction.

Boss portions 40 are integrally formed on an inside face of the clutch cover 20 corresponding to the projections 38. A pin 41 is disposed between each boss portion 40 and the projection 38. Thus, the clutch cover 20 and the retainer 32 are coupled to rotate integrally by means of the pins 41. That is to say, a front end portion of the pin is fixed to the projection 38, by press fitting or caulking and a rear end portion is fitted to the boss portion 40 with a bushing 41a therethrough. The rear portion of the pin 41 can slide in the bushing 41a.

Figure 2:
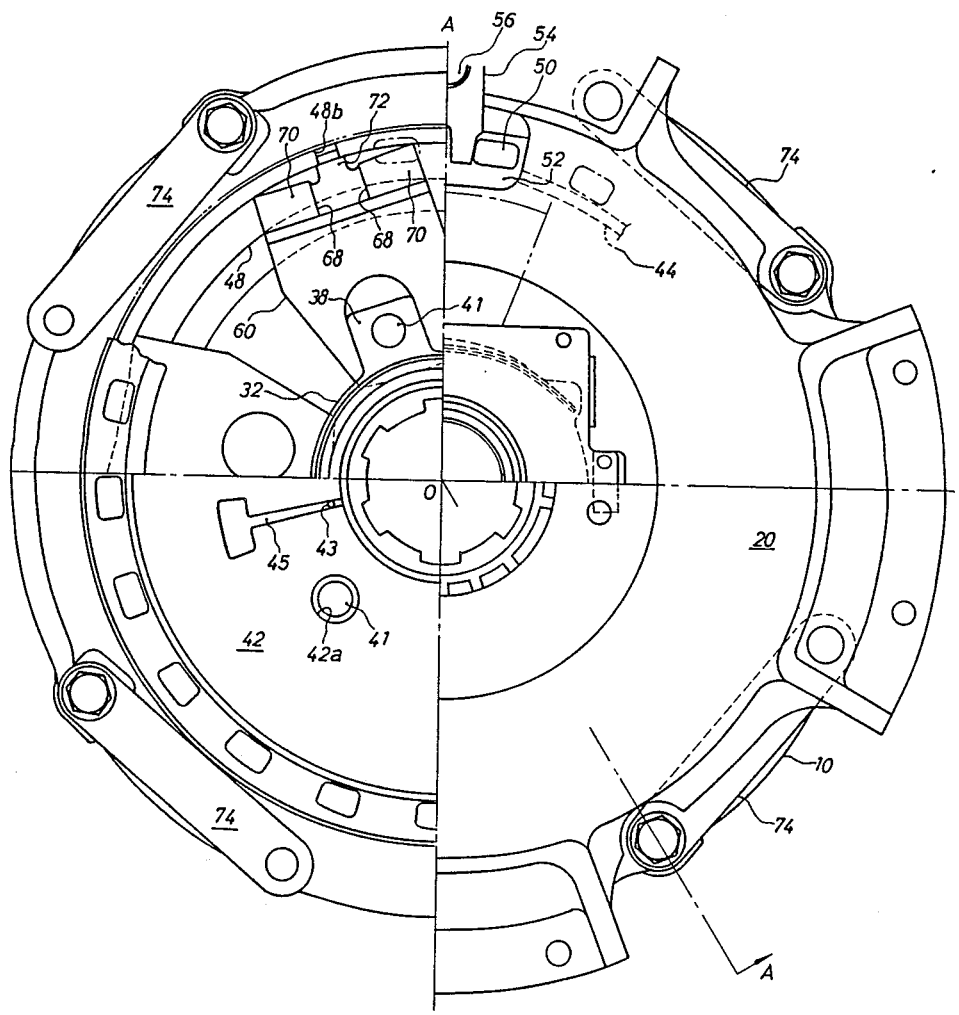
FIG. 2 is a view of the clutch in FIG. 1 taken in the direction of arrow II, FIG. 1.

A diaphragm spring 42 (spring member) is installed between the clutch cover 20 and the retainer 32 and is formed into approximately disc-shape. An outer peripheral portion of the diaphragm spring 42 is held to the clutch cover 20 by a projection 44 on the clutch cover 20. As shown in FIG. 2, the projection 44 is formed approximately ring-shaped over the entire periphery except for the recess 52 of the clutch cover 20.

An inner peripheral portion of the diaphragm spring 42 presses on the pressing portion 34 of the retainer 32, FIG. 1. A hole 42a (FIG. 2) passing the mating projections 40, FIG. 1, is formed at a portion corresponding to the pin 41 of the diaphragm spring 42.

An inner peripheral part of the diaphragm spring 42 is connected to pressing part 34 of retainer 32 by a rolled pin 43. The rolled pin 43 is provided at different cross sectional positions from the cross sectional position shown in FIG. 1 in the peripheral direction. As shown in FIG. 2, the rolled pin 43 fits through slits 45 of the diaphragm spring 42. Further, the rolled pin 43 and the slit 45 are disposed at three places in the circumferential direction with 120 degrees equal distances therebetween. As shown in FIG. 1, a threaded part 20a is formed on an inner peripheral face of the clutch cover 20, radial outside of the diaphragm spring 42, and a threaded part 48 of an approximately annular adjuster ring 48 is threaded to the threaded part 20a.

Projections 50 are formed at twenty-four places, in the circumferential direction for example, on a rear end face of the adjuster 48 with equal distances left therebetween. The projections 50 are formed at a radially outer peripheral part of the adjuster ring 48.

Holes 52 are formed on the clutch cover 20 corresponding to the projections 50, and a lock plate 54 is fastened by a bolt 56 to the hole 52. A bottom part of the lock plate 54, FIG. 1, engages with the projections 50, so that the adjuster ring 48 and the clutch cover 20 are integrally coupled together through means of the lock plate 54 while permitting axial positional adjustment of the adjuster ring 48.

Levers 60, for releasing operation, are disposed at six places, circumferentially, between the pressure plate 18 and the retainer 32 with equal distances left therebetween. An inner peripheral side fulcrum 61 of the lever 60 fits in the annular groove 36, an outer peripheral side fulcrum 64 presses on a front end face of the adjuster ring 48 and an intermediate fulcrum 66 presses on a fulcrum land 18a of the pressure plate 18. Lever ratios of these inner peripheral side fulcrum 64, outer peripheral side fulcrum 64 and intermediate fulcrum 66 are set to L1 and L2, respectively, FIG. 1.

Figure 2A:
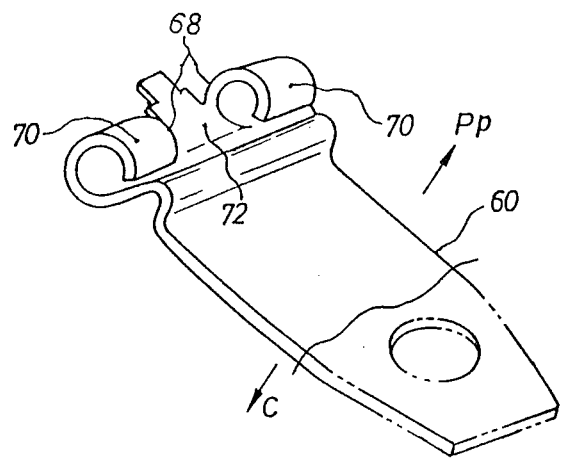
FIG. 2a is a perspective view of the lever.

The foregoing lever 60 is a component made, for example, by plate working. As shown in FIG. 2 and FIG. 2a, two curve lines 68 are formed at a radially outer peripheral part of the lever 60. The outer peripheral side fulcrum 64 and intermediate fulcrum 66 (FIG. i) are formed by bending external pieces at the opposite sides. A central piece 72 of the central portion extending radially outwardly fits in a recessed part 48b of the adjuster ring 48. In FIG. 2a, arrow Pp indicates the direction of the pressure plate 18 and the arrow C indicates the direction of the clutch cover 20.

The lever 60 is also described in Japanese Patent Application Ser. No. 61-36034 by the applicants of the present application.

Well-known circumferentially extending strap plates 74 are disposed at four places between an outer peripheral part of the pressure plate 18 and the clutch cover 20 with equal circumferential distances left therebetween.

An inertia brake 78 is interposed between the pressing plate 28a of FIG. 1 and the transmission side end face 76 and is spline fitted onto the input shaft 22.

The inertia clutch brake 78 has facings 80 and 82 on its opposite end faces. A releasing allowance Rr is provided between the facing 82 and the pressing plate 28a.

Figure 5:
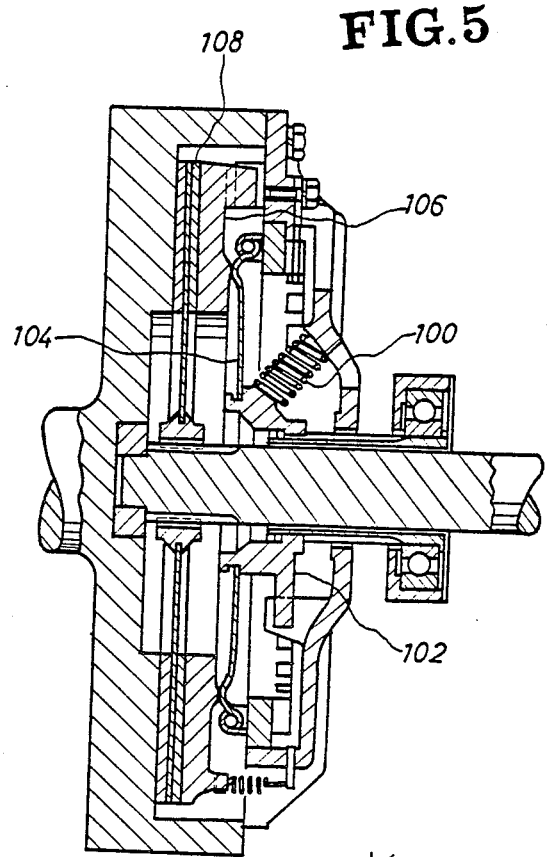
FIG. 5 is a vertical sectional view of a conventional pull-type clutch.

The machining work cost of the pull-type clutch of the present invention is less than the conventional pull-type clutch shown in FIG. 5. Because the clutch cover 20 and the retainer 32 are connected by the pin 41, there is no need of milling work, as required on the studs 117, FIG. 5.

Because the sleeve 24 and the retainer 32 are coupled integrally by the spring force of the cone spring 32b, the cone spring 32b presses the retainer to the flange part 25 of the sleeve 24 against the thrust washer 30. Accordingly, there is no need of machining work to form the spline part, and the machining costs, as required in the conventional pull-type clutch in FIG. 5, are reduced. In the prior art, there is need to work machining setting circumferential angle of the sleeve 24.

In an initial setting state, as shown by a solid line of FIG. 1, a spring force P of the diaphragm spring 42 presses the pressing part 34 of the retainer 32 forward. This spring force P is transmitted from the inner peripheral side fulcrum 62 of the annular groove 36 to the lever 60, and further transmitted, as the pressing force of the clutch discs 12 and 16, from the intermediate fulcrum to the fulcrum land 18a and magnified to about three times, for example, with the lever ratio of L1 to L2.

Because the diaphragm spring 42 is held in an approximately flat position under this state, the diaphragm spring 42 is scarcely affected by the centrifugal force, even at a high rotation speed, so that there is no possibility of decrease in the pressing force applied to the cluch discs 12 and 16.

The inner peripheral part of the diaphragm spring 42 engages the pressing part 34 of the retainer 32 through rolled-pin 43. The diaphragm spring 42 rotates together with the retainer 32.

When the clutch discs 12 and 16 have been worn down, after a long time of operation, the pressure plate 18 moves forward and the retainer 32 also moves forward. In this worn-down state, the diaphragm spring 42 comes to a W-position shown by the two-dot line in FIG. 1. Because the outer peripheral part of the lever 60 takes up a backwardly inclining position under this state, a normal position of the lever 60 is recovered by threading the adjuster ring 48 forwardly after removing the lock plate 54.

Figure 3:
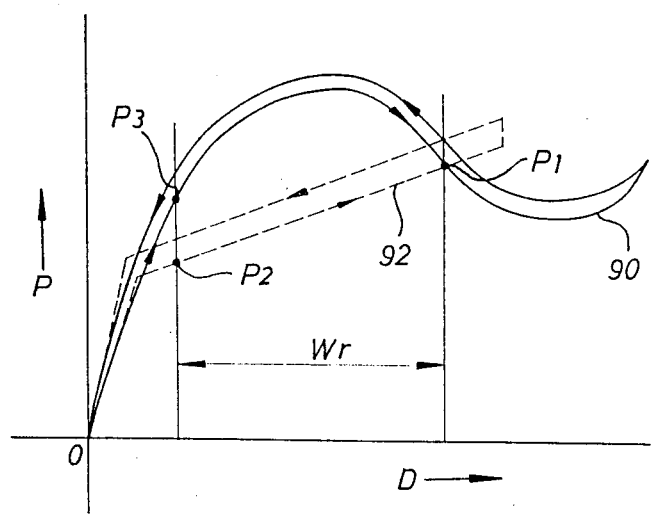
FIG. 3 is a graph showing the relation between the spring force and the distortion of the diaphragm spring.

The spring charcateristic curve of the diaphragm spring 42, as shown in the graph, FIG. 3, has an upwardly convex shape within a range of worn-down allowance Wr corresponding to the wear amount of clutch discs 12 and 16 as shown by curve 90 of FIG. 3 representing the relation between the distortion D and the spring force P. Thus, the spring force P, generated by the diaphragm spring 42, becomes larger than of a characteristic curve 92 for a conventional coil spring 100 (FIG. 5), and the pressing force of the pressure plate 18 on the clutch disc 12 and 16 increases as compared with conventional springs.

When the clutch disc 12 and 16 are worn down, the spring force decreases from a setting load P1 to a worn-down load P2, in case of the characteristics curve, FIG. 3, but it decreases from the setting load P1 only down to a worn-down load P3, in case of the characteristic curve 90, so that a so-called worn-down load at the time that the clutch discs 12 and 16 are worn out become large. Moreover, the above-mentioned characteristic curve 90 can afford a decrease in a releasing force required for releasing the clutch to lighten the depressing force required on the clutch pedal.

At the time of the releasing, i.e. when the clutch pedal is depressed, the release lever 27 causes the release bearing 26 to move backward. The sleeve 24 also slides together with the release bearing 26. When the sleeve 24 slides backward, the retainer 32, held by the snap ring 32a, is pulled backward against the spring force P of the diaphragm spring 42, Thus, the diaphragm spring 42 takes up the R-position of FIG. 1. In this instance, the inner peripheral side fulcrum 62 of the lever 60 moves backward, around the outer peripheral side fulcrum 64, and the intermediate fulcrum also moves backward. Hence, the pressure plate 18 is moved backward by the spring force of the strap plates 74 and the pressing state of the clutch discs 12 and 16 are released.

EFFECT OF THE INVENTION

Figure 6:
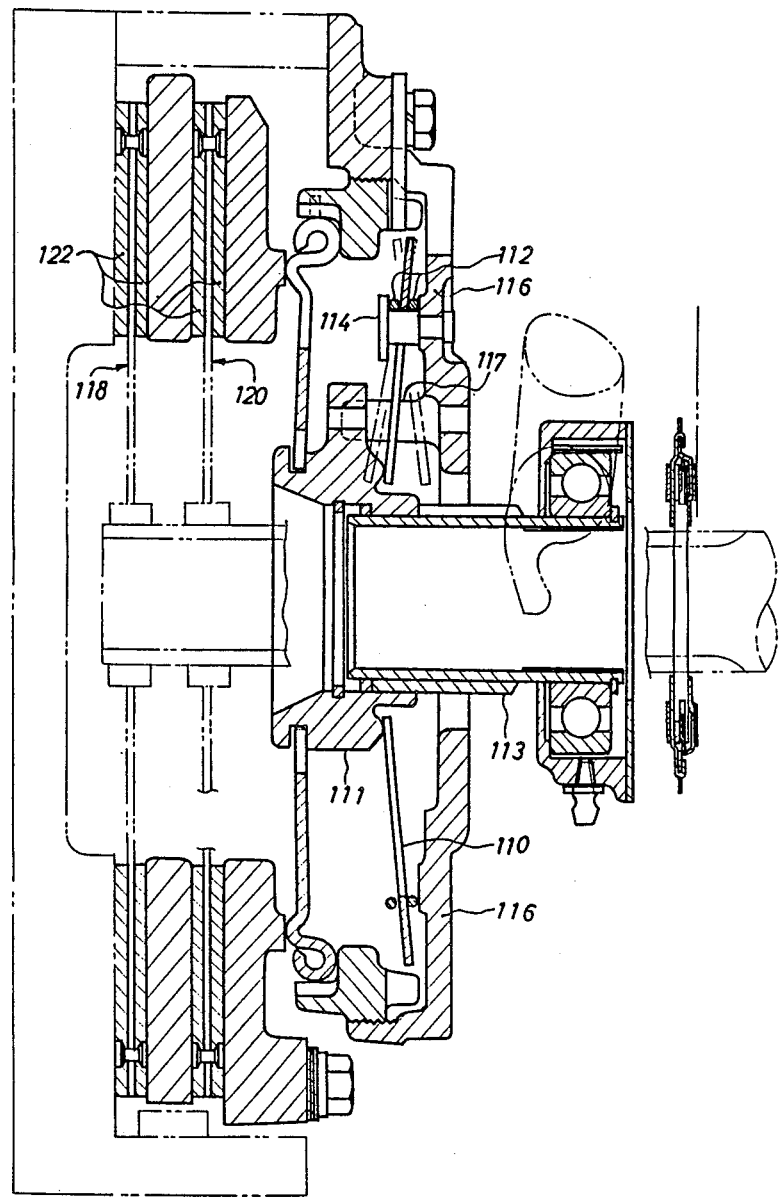
FIG. 6 is a vertical sectional view of the pull-type clutch of applicants' prior application, now U.S. Pat. No. 4,720,002.

As described above, in the clutch according to the present invention, machining work costs are reduced as compared to the costs of the pull-type clutch of our prior '655 application shown in FIG. 6, because the clutch cover 20 and the retainer 32 are engaged by the pin 41. There is no need for milling work on the studs 117 (FIG. 6).

Further, there is no need of machining work to form the spline part and the cost for machining work are reduced because the sleeve 24 and the retainer 32 are coupled integrally by the spring force of cone spring 32b. The cone spring 32b presses the retainer to the flange 24 of the sleeve 24 against the thrust washer 30. There is no need for machining for setting the circumferential angle of the sleeve 24.

ANOTHER EMBODIMENT

Figure 4:
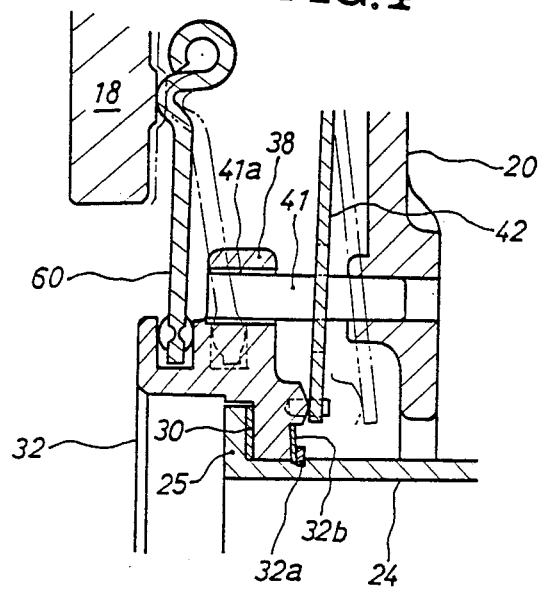
FIG. 4 is a vertical sectional view of another embodiment.

The construction described in the foregoing embodiment, as well as the embodiment shown in FIG. 4 may be used in the practice of the invention. In FIG. 4, the rear end part of the pin 41 is fixed by means of press fitting or caulking to the clutch cover 20 an the front end part of the pin 41 fits, axially sliding, in bushing 41a provided at the projection 38.

We claim:

1. In a clutch having a releasing operation by pulling a release bearing away from a flywheel by means of a releasing lever connected to a clutch pedal; a flywheel, a transmission having an input shaft, a clutch disc between said flywheel and said transmission and spline fitted onto said input shaft, a sleeve on the outer periphery of said input shaft, a release bearing fastened to the transmission end of said sleeve, a flange portion on said sleeve at the flywheel end of said sleeve, said flange portion projecting radially outward from the outer periphery of said sleeve; a load transmitting retainer on said sleeve in pressing engagement with said flange portion for applying a thrust force to a thrust force transmitting member actuated thereby, said retainer and said sleeve being axially slidable on said input shaft; a clutch cover connected to said flywheel and covering a pressure plate for pressing said clutch disc against said flywheel when said thrust force is applied to said thrust force transmitting member; a disc-formed spring member disposed between said clutch cover and said retainer for applying a spring force to said load transmitting retainer and said thrust force transmitting member actuated by said retainer; circumferentially spaced pins between said retainer and said clutch cover and passing freely through said spring member, each of said circumferentially spaced pins, at one of its ends, being fixed to one of said retainer and said clutch cover and being slidable, at its other end, through the other of said retainer and said cover, said disc-formed spring member being a diaphragm spring having an inner peripheral part in engagement with said retainer with rolled pins between said inner peripheral part of said diaphragm spring and said retainer.

2. A clutch as set forth in claim 1 in which said each of said circumferentially spaced pins between said retainer and said clutch cover is fixed to said retainer and is axially slidable in said clutch cover with a bushing between said each of said pins and said cover.

3. A clutch as set forth in claim 1 in which said each of said circumferentially spaced pins between said retainer and said clutch cover is fixed to said clutch cover and is axially slidable in said retainer with a bushing between said each of said pins and said retainer.

4. A clutch as set forth in claim 1 in which said diaphragm spring has radially disposed slits and holes formed in said diaphragm spring intermediate said slits for the passage of said each of said circumferentially spaced pins between said retainer and said clutch cover through said diaphragm spring.

5. A clutch as set forth in claim 1 in which said retainer is a substantially annular forging, said pressing part of said retainer on which said inner peripheral part of said diaphragm spring presses projects over the entire circumference of an end face of said retainer at the transmission side end portion of said retainer, said retainer having over the entire circumference at the flywheel end portion of said retainer an annular groove in which the inner peripheral end of said force transmitting member is engaged, said retainer having radially outwardly extending projections formed on an outer peripheral part of said retainer, said each of said circumferentially spaced pins, at said one of its ends, being fixed to one of said radially outwardly extending projections and being slidable, at its other end, through said cover.

* * * * *